United States Patent [19]

Knox et al.

[11] Patent Number: 5,436,756
[45] Date of Patent: Jul. 25, 1995

[54] SUPPRESSED PHOTOCURRENT, QUANTUM WELL OPTICAL MODULATION DEVICE

[75] Inventors: Wayne H. Knox, Rumson; Jason B. Stark, Holmdel; Benjamin Tell, Aberdeen; Ted K. Woodward, Lincroft, all of N.J.

[73] Assignee: AT&T Bell Laboratories, Murray Hill, N.J.

[21] Appl. No.: 954,201

[22] Filed: Sep. 30, 1992

[51] Int. Cl.⁶ .............................................. G02F 1/03
[52] U.S. Cl. .................................. 359/260; 257/458; 257/656
[58] Field of Search ...................... 359/245, 248, 260; 257/610, 611, 612, 656, 458, 21

[56] References Cited

U.S. PATENT DOCUMENTS

| | | | |
|---|---|---|---|
| 5,008,717 | 4/1991 | Bar-Joseph et al. | 359/245 |
| 5,105,301 | 4/1992 | Campi | 359/245 |
| 5,115,335 | 5/1992 | Soref | 359/248 |
| 5,216,260 | 6/1993 | Schubert et al. | 257/656 |

OTHER PUBLICATIONS

D. A. B. Miller et al., *Physical Review Letters*, vol. 53, No. 22, Nov. 26, 1984, "Band-Edge Electroabsorption in Quantum Well Structures: The Quantum-Confined Stark Effect," pp. 2173-2176.
Y. Silberberg et al., *Applied Physics Letters*, vol. 46, No. 8, Apr. 15, 1985, "Fast Nonlinear Optical Response from Proton-Bombarded Multiple Quantum Well Structure," pp. 701-703.
M. Wegener et al., *Applied Physics Letters*, vol. 55, No. 6, Aug. 7, 1989, "Electroabsorption and Refraction by Electron Transfer in Asymmetric Modulation-Doped Multiple Well Structures," pp. 583-585.
D. A. B. Miller, *Optical and Quantum Electronics*, vol. 22, 1990, "Quantum-Well Self-Electro-Optic Effect Devices," pp. S61-S98.
M. Lambsdorff et al., *Applied Physics Letters*, vol. 58, No. 17, Apr. 29, 1991, "Subpicosecond Carrier Lifetimes in Radiation-Damaged GaAs," pp. 1881-1883.
W. H. Knox et al., *Applied Physics Letters*, vol. 59, No. 12, Sep. 16, 1991, "Low-Temperature-Grown GaAs Quantum Wells: Femtosecond Nonlinear Optical and Parallel-Field Transport Studies," pp. 1491-1493.
T. K. Woodward et al., *Applied Physics Letters*, vol. 60, No. 6, Feb. 10, 1992, "Suppressed Photocurrent Multiple-Quantum-Well Optical Modulators by Proton Implantation," pp. 742-744.

*Primary Examiner*—F. Daniel Lopez
*Attorney, Agent, or Firm*—Gregory C. Ranieri

[57] ABSTRACT

Photocurrent suppression is achieved without deleteriously affecting modulation performance in a surface normal, electro-absorption, quantum well modulator by introducing a sufficient number of non-radiative recombination centers in the quantum well region of the modulator. The presence of the non-radiative recombination centers significantly shortens the lifetime of photogenerated carriers and, thereby, suppresses the photocurrent. Modulation performance characteristics such as contrast ratio are maintained at acceptable levels even though exciton broadening occurs in the quantum wells. The present modulator exhibits a careful balance between defect density in the quantum wells and the acceptable degree of exciton broadening necessary to preserve quantum effects.

8 Claims, 3 Drawing Sheets

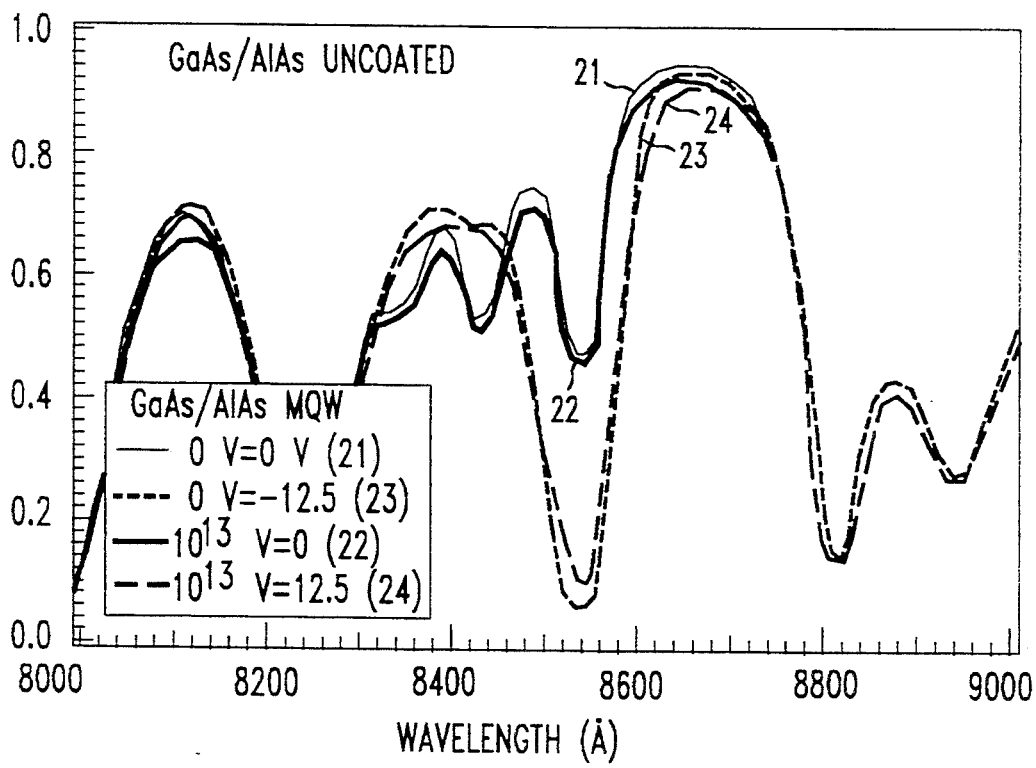
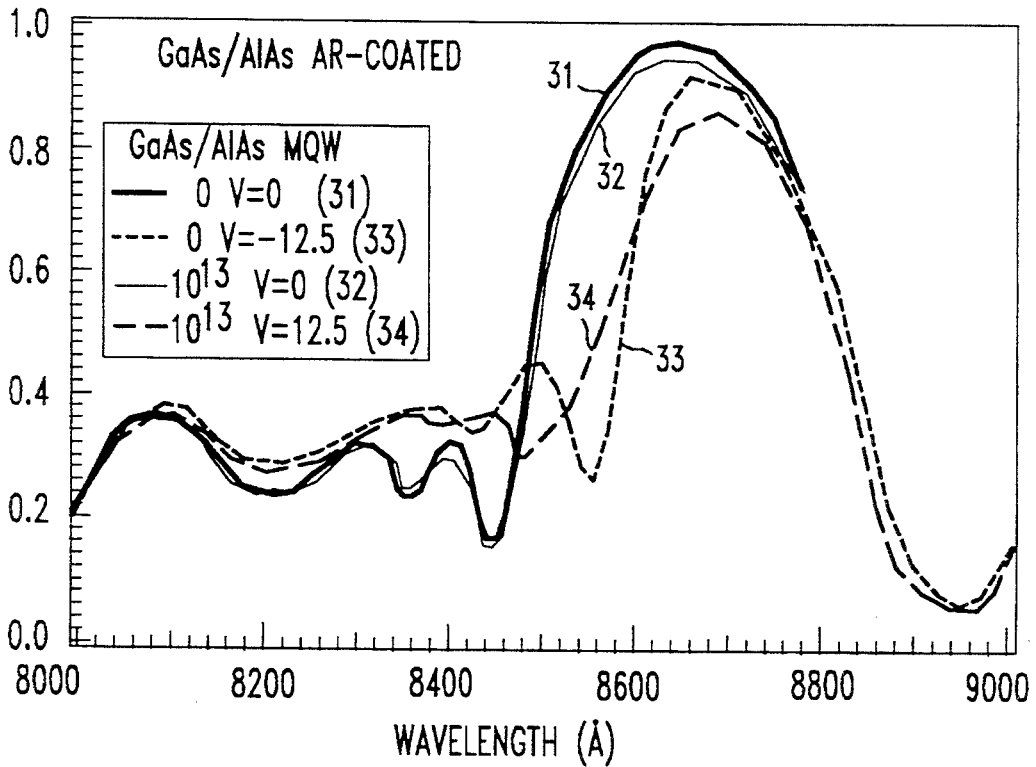

SUPPRESSED PHOTOCURRENT, QUANTUM WELL OPTICAL MODULATION DEVICE

Technical Field

This invention relates to semiconductor optical modulation devices and, more particularly, to such devices incorporating quantum well regions therein.

BACKGROUND OF THE INVENTION

Optical computing, optical switching, and optical interconnection are three emerging technology areas which depend on the ability to modulate optical beams. In several of theses areas, most interest is focussed on the semiconductor devices and arrays which operate on light beams propagating perpendicular to the surface plane of the devices or arrays. Such devices are commonly called "surface-normal" devices. These devices are relatively compact which, in turn, leads to simple and efficient coupling to the devices.

A recent class of surface normal devices has been developed in which a p-i-n diode structure is realized with one or more quantum wells located usually in the intrinsic region between the p and n contact regions. One example of a high speed, surface normal optical modulator employing semiconductor quantum wells is shown in U.S. Pat. No. 4,525,687. This particular type of modulator employs electro-absorption to perform optical modulation. Optical beams incident normal to the modulator surface are either absorbed within the quantum well region of the modulator or permitted to pass through the modulator without significant absorption. Absorption and, thereby, modulation are controlled by electrical signals applied to the modulator.

When a modulator absorbs photons from the incident optical beam, electron-hole pairs are generated. The presence of these carrier pairs disturbs the absorption characteristics of the quantum well region in the modulator. Motion of the carriers through the modulator under the influence of applied electric fields results in ohmic heating and increases the power dissipated in the modulator, potentially to values significantly exceeding the absorbed optical power.

Heating within the modulator produces a shift of the semiconductor quantum well absorption edge to a new wavelength. This shift results in a misalignment of the absorption wavelength and the incident optical beam wavelength so that modulation ceases or is severely affected. Thus, ohmic heating limits the maximum optical power which can be modulated.

Photo-generated electrical charge carriers also tend to screen applied electric fields, which hampers or even inhibits the modulation process when carrier populations are sufficiently high. Moreover, carrier production reduces the optical absorption coefficient of the quantum well material by exciton bleaching and, thereby, makes this type of modulator unattractive for higher optical beam intensity applications.

The problems caused by these effects within the absorption modulators have detracted to some degree from the initial appeal of the devices and have caused device designers to favor other electro-optic effects such as electrore-fraction for realizing satisfactory optical modulators. There has been no known effort to alleviate the problems associated with the electro-absorption, quantum well modulators.

SUMMARY OF THE INVENTION

Photocurrent suppression is achieved without deleteriously affecting modulation performance in a surface normal, electro-absorption, quantum well modulator by introducing a sufficient number of non-radiative recombination centers in the quantum well region of the modulator. The presence of the non-radiative recombination centers significantly shortens the lifetime of photogenerated carriers and, thereby, suppresses the photocurrent. This suppression greatly reduces ohmic heating in the modulator and decreases the dissipated power to a level approaching the absorbed optical power. In addition, carrier population in the quantum well region is reduced which, in turn, reduces the saturation effects arising from the presence of carriers in the quantum wells. Modulation performance characteristics such as contrast ratio are maintained at acceptable levels even though exciton broadening occurs in the quantum wells. The present modulator exhibits a careful balance between defect density in the quantum wells and the acceptable degree of exciton broadening necessary to preserve quantum effects. As such, this modulator retains the useful properties of suppressed photocurrent and satisfactory contrast ratio while exhibiting improved saturation intensity.

In one embodiment, a p-i-n diode structure is employed for the modulator wherein the quantum wells are positioned in the intrinsic region of the diode. Non-radiative recombination centers are formed by proton implantation of the quantum well layers. Operation in a reflection mode is permitted by depositing a dielectric, quarter-wave stack mirror beneath the modulator and by anti-reflection coating the top surface of the modulator to reduce Fabry-Perot resonance effects.

In another embodiment, the proton implanted, p-i-n diode is placed in a Fabry-Perot etalon, which is obtained by omitting the top surface modulator anti-reflection coating described above. For this modulator structure, the contrast ratio experiences little change or impairment because of implantation.

BRIEF DESCRIPTION OF THE DRAWING

A more complete understanding of the invention may be obtained by reading the following description of specific illustrative embodiments of the invention in conjunction with the appended drawing in which:

FIG. 2 shows a comparison of the reflectivity versus wavelength for implanted devices as shown in FIG. 1 and for non-implanted devices, when the devices are placed within a Fabry-Perot etalon;

FIG. 3 shows a comparison of the reflectivity versus wavelength for implanted devices as shown in FIG. 1 and for non-implanted devices, wherein the devices have been anti-reflection coated to reduce Fabry-Perot effects;

DETAILED DESCRIPTION

Figure 1:
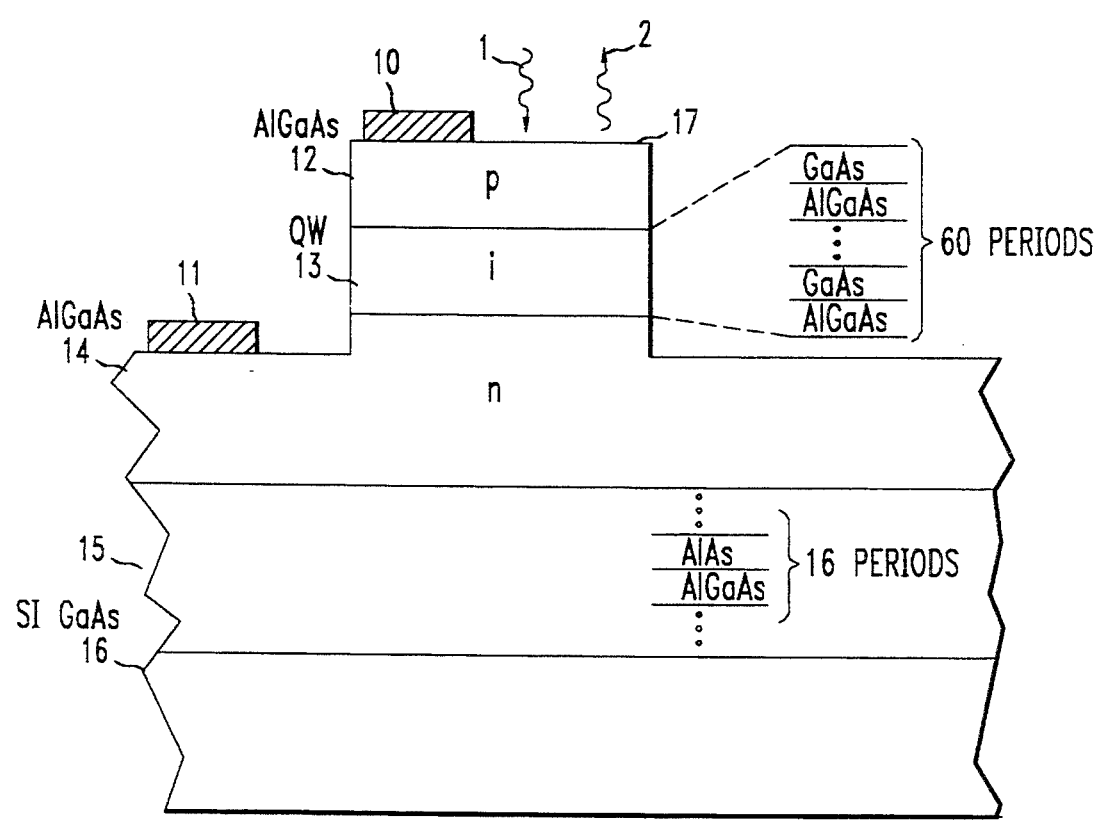
FIG. 1 shows a cross-sectional view of a simplified implanted, quantum well, p-i-n optical modulator structure having an AlAs/AlGaAs dielectric stack mirror for reflection mode operation, wherein the structure is realized in accordance with the principles of the present invention.

Electro-absorption optical modulators dissipate power inside the semiconductor device. Generally, it is desirable to minimize power dissipation because it is a major contributing factor in determining device packing density and device operating parameters such as maximum optical input power.

An ideal absorption modulator theoretically dissipates an amount of energy equal to the optical energy absorbed from photons of the incident light beam. Absorption of a photon in a semiconductor modulator generates an electron-hole pair having the same total energy as that absorbed from the incident photon. In order to restore thermal equilibrium to the semiconductor, it is necessary that the photo-generated carriers, the electron and the hole, lose an amount of energy equal to that of the absorbed photon. Without radiative recombination, the lost energy is deposited as heat in the semiconductor material of the modulator. This process of losing energy is termed intrinsic dissipation and involves the minimum amount of dissipated energy possible from an absorption event.

Energy dissipated in excess of the minimum is from non-intrinsic dissipation processes. External energy sources connected to the modulator are the sources of non-intrinsic dissipation. The most common source is from the electromagnetic field used in performing modulation. Photo-generated carriers are capable of acquiring energy from the applied field. This energy is then dissipated through the action of photo-current and it may greatly exceed the amount of intrinsic energy dissipation. For example, in a standard multiple quantum well, p-i-n diode modulator, an absorption event results in generation of an electron-hole pair with a total energy equal to the bandgap energy of the material, for example, about 1.42 eV in GaAs. However, motion of the photo-generated carriers through a 5 V externally applied potential dissipates 5 eV of energy which clearly dominates the intrinsic dissipation.

Since there are carriers produced in the operation of electro-absorptive modulators, such carriers can potentially produce a photocurrent by moving through the device under the influence of the electric field. Inhibition of the photocurrent is realizable by inserting potential energy barriers in the path of the moving carriers (photocurrent) or by reducing carrier lifetime so that carriers recombine before traversing any significant distance in the device. The present device shown in an exemplary embodiment in FIG. 1 utilizes both photocurrent inhibiting techniques. In the present device, it has been determined that techniques for decreasing carrier lifetime in the intrinsic quantum well region diminish certain exciton properties which directly affect modulator contrast ratio and the like. But, such techniques can be controlled to retain desirable optical properties such as absorption for the modulator.

Carrier lifetime in intrinsic multiple quantum well material is approximately 1 ns. For a typical multiple quantum well p-i-n diode, electrons transported at saturated carrier velocities on the order of $10^7$ cm/sec traverse a 1 μm region in approximately 10 picoseconds. In order to prevent significant motion of the carriers which would lead to photocurrent, carriers should be confined within a quantum well until recombination occurs. Moreover, recombination time should be made as short as possible to alleviate saturation problems. As a result, acceptable carrier lifetimes for this example are expected to be in the range of 10 picoseconds in order to suppress photocurrent in a significant way.

Carrier lifetime comprises radiative and non-radiative components. Non-radiative carrier lifetime components are most easily controllable in semiconductor material by the introduction of non-radiative carrier recombination centers in the semiconductor quantum well material. Non-radiative recombination centers are introduced in semiconductor material by standard techniques such as ion implantation, introduction of deep level impurities, formation of interstitials, formation of vacancies, local clustering of atoms, growth of polycrystalline material, and formation of material having a large number of defects or impurities. While the introduction of non-radiative recombination centers reduces carrier lifetime during optical absorption, it is also desirable to have this semiconductor quantum well material exhibit high resistivity so that the device is inhibited from drawing current from external sources in the absence of incident light.

Both non-radiative recombination centers and high resistivity of the semiconductor quantum well material have been produced for the present modulator by using ion implantation and, more particularly, proton implantation. Proton implantation is attractive in this application because it can be used selectively for different devices on a wafer and because it is used after the completion of layer growth and device processing. Proton implantation of bulk GaAs has been reported to decrease carrier lifetime to a minimum level of 5 ps in Lambsdorff et al., Appl. Phys. Lett., Vol. 58, No. 17, pp. 1881-3 (Apr. 1991). In earlier work, proton implantation of an $Al_{0.29}Ga_{0.71}As$/GaAs multiple quantum well structure (80 periods) on a GaAs substrate was reported to decrease carrier lifetime from 30 ns to approximately 150 ps in Y. Silberberg et al., *Appl. Phys. Lett.*, Vol. 46, No. 8, pp. 701-3 (1985). The latter work noted that further reduction of the carrier lifetime could be obtained at the risk of degrading desirable characteristics such as excitonic absorption and nonlinear response. It is important to note that the reported carrier lifetime reduction is still more that one order of magnitude greater than the carrier lifetime described above for surface normal, multiple quantum well, p-i-n modulators realized in accordance with the principles of the present invention.

An exemplary surface normal, multiple quantum well, p-i-n diode modulator is depicted in FIG. 1. This modulator includes p and n contact regions, an intrinsic (i) multiple quantum well region, a reflector region, and metallic contacts, all formed on a semiconductor substrate.

The various semiconductor layers are grown on semi-insulating GaAs substrate 16 by standard epitaxial growth techniques. Epitaxial growth techniques for semiconductor compounds such as Group III-V compounds are well known to persons of ordinary skill in the art and include molecular beam epitaxy (MBE) and metal organic chemical vapor deposition (MOCVD), for example.

Reflector region 15 is grown on substrate 16. Reflector region 15 is a semiconductor thin film reflector designed to reflect optical beams propagating in a predetermined band of wavelengths around a desired wavelength, usually the wavelength of the incident optical beam 1. The reflector region comprises sixteen pairs of layers having an optical thickness λ/4 n where λ is the optical wavelength and n is the effective refractive index of the layer wherein each pair includes a 711Å layer of AlAs and 599Å layer of $Al_{0.11}Ga_{0.89}As$. This exemplary layer structure realizes a reflector for wavelengths in the neighborhood of 850 nm (0.850 μm). Semiconductor layers have been utilized for the reflector region in order to integrate the reflector more easily into the entire semiconductor device. The use of the reflector region is not required when the opaque substrate is etched away to reveal the bottom of contact layer 14 or when the substrate is translucent or transparent at the incident optical wavelength. By using a reflector region, incident optical beams make two passes through the p-i-n structure.

Contact region 14 exhibits n-type conductivity. In the exemplary embodiment, a 5000Å thick layer of $Al_{0.11}Ga_{0.89}As$ doped with silicon at an approximate concentration of $10^{18}$ cm$^-$ exhibits n+conductivity for contact region 14.

Intrinsic quantum well region 13 is intentionally undoped and includes narrow bandgap layers interleaved with wide bandgap layers. The narrow bandgap layers are called quantum well layers and are sufficiently thin to exhibit quantum size effects, that is, quantization of the available conduction band into discrete energy levels. The wide bandgap layers are called barrier layers. While there is no constraint on the thickness of barrier layers, the thickness of each quantum well layer is usually less than several hundred Å. In the exemplary embodiment shown in FIG. 1, the GaAs quantum well layers are approximately 100Å whereas the $Al_xGa_{1-x}As$ barrier layers are approximately 60Å for an Al mole fraction x of 0.7. The height of the barrier layer is changed by varying the mole fraction to a value between 0.02 and 1.0. Sixty periods or quantum well/barrier layer pairs are employed in quantum well region 13.

Contact region 12 exhibits p-type conductivity. In the exemplary embodiment, a 5000Å thick layer of $Al_{0.11}Ga_{0.89}As$ doped with beryllium at an approximate concentration of $10^{18}$ cm$^{-3}$ exhibits p+ conductivity for contact region 12. This embodiment assists in localizing the non-radiative recombination centers in the quantum well region. In an alternative embodiment, contact region 12 comprises a 1000Å p+ GaAs cap layer over a 2000Å p+ $Al_{0.11}Ga_{0.89}As$ layer in contact with quantum well region 13. This embodiment does not offer the same extent of localization as the former embodiment.

Standard photolithography and etching techniques were employed to form a mesa device wherein contact is made to underlying contact region 14. Once the mesa is formed, metallic p and n contacts are applied to contact regions 12 and 14, respectively. Standard ohmic contact deposition and alloying techniques are employed to form the particular contacts.

Figure 4:
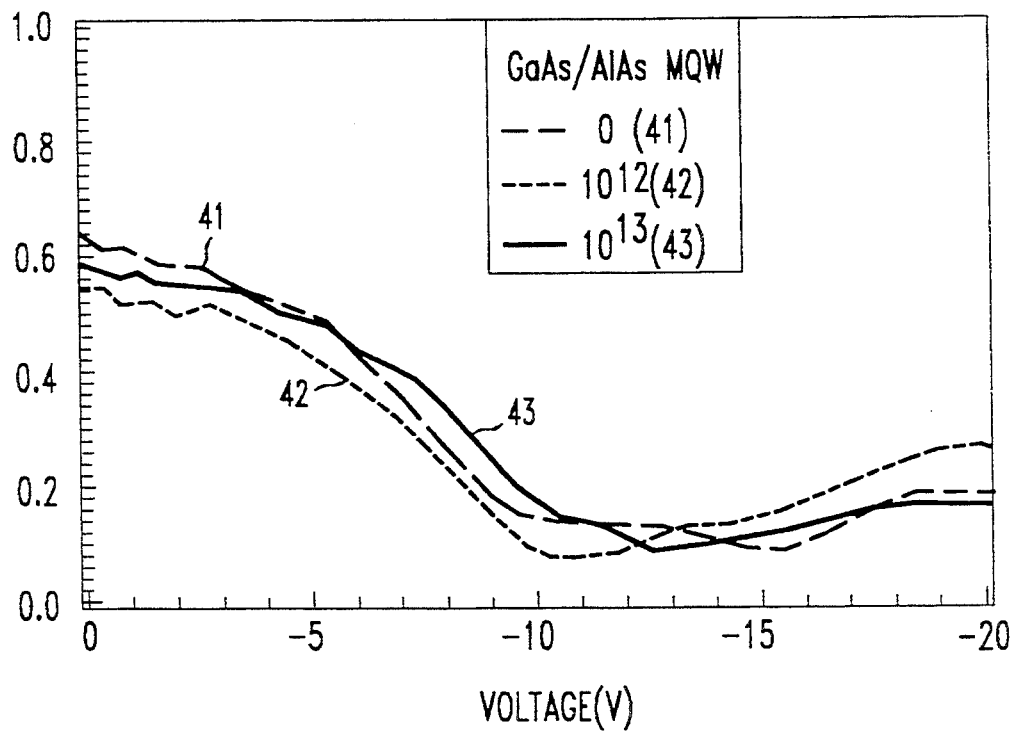
FIG. 4 shows reflectivity versus applied voltage for devices in Fabry-Perot etalons wherein the devices are both implanted and non-implanted.

Anti-reflection coatings have been applied to surface 17 of the contact region 12. Such anti-reflection coatings reduce reflections from surface 17. Without an anti-reflection coating on surface 17, sufficient reflectivity from the crystallographic plane at surface 17 exists to form a weak Fabry-Perot etalon with reflector region 15. Of course, standard thin film stack reflective layers can be applied to the surface 17 to further increase its reflectivity and the finesse of the resulting Fabry-Perot etalon. By incorporating the p-i-n modulator within a Fabry-Perot etalon, the reflectivity for a modulator realized in accordance with the principles of the invention is effectively made equal to the reflectivity for a standard non-implanted p-i-n modulator as depicted in FIGS. 2 and 4. This means that by the addition of a Fabry-Perot etalon to the present p-i-n modulator that it is possible to maintain a high degree of modulation performance while obtaining significant photocurrent suppression.

Non-radiative recombination centers for suppressing the photocurrent are produced in the intrinsic quantum well region following growth of the modulator. Formation of the recombination centers may be accomplished at various stages in the device processing. Proton implantation is utilized to form the non-radiative recombination centers. The proton energy and the proton dose levels are chosen for the semiconductor material to achieve a sufficient density of non-radiative recombination centers localized or substantially centered in the intrinsic quantum well region.

Highly energetic protons tend to be propelled through the quantum well region and even through the entire device before coming to rest. Low energy protons may possess insufficient energy to reach the intrinsic quantum well region.

With respect to the dose levels, it should be noted that increased dose levels produce higher densities of non-radiative recombination centers per unit volume of material. However, too high a dose level causes degradation, or even annihilation, of the exciton absorption characteristic, while too low a dose level fails to produce sufficient photocurrent suppression. The measure commonly associated with exciton absorption is device reflectivity and the measure commonly associated with photocurrent suppression is device responsivity. Both of these measures are reflected in the curves presented in FIGS. 2 through 5.

For the exemplary embodiment shown in FIG. 1, a proton energy of 130 keV was utilized. Dose levels were approximately $1 \times 10^{12}$ cm$^{-2}$, $1 \times 10^{13}$ cm$^{-2}$, and $1 \times 10^{14}$ cm$^{-2}$. From a study of the devices implanted at these dose levels, it was determined that exciton broadening became extreme in this material system for the proton dose of $1 \times 10^{14}$ cm$^{-2}$. It was determined that all implanted p-i-n devices exhibited modulator behavior, although performance for anti-reflection coated devices was degraded monotonically with increasing implantation level. For implanted devices having barrier layers with an Al mole fraction of x=0.3, it was found that responsivity was reduced at low biases with the lowest values of responsivity occurring for devices having higher implantation dose levels. Despite the reduction in responsivity, it was noted that the quantum-confined Stark effect persisted. As the bias level was increased, responsivity for the implanted p-i-n devices recovered to levels near the responsivity for non-implanted devices. As presently understood, this effect is attributable to decreased quantum well storage time, thereby decreasing the amount of time spent by a carrier in the high field region of the device. However, in sample devices with AlAs barrier layers, photocurrent suppression was maintained with high levels of applied bias, as described below and illustrated in the FIGS.

FIG. 2 shows a comparison of reflectivity versus wavelength for two p-i-n modulators operated at two different bias levels. The p-i-n modulators were formed in a Fabry-Perot etalon and incorporated GaAs quantum well layers and AlAs barrier layers in the intrinsic quantum well region. The p-i-n modulators were subjected to bias potentials of 0 V and −12.5 V over a range of incident optical wavelengths between 800 nm and 900 nm. Curves 21 and 23 show the reflectivity for a non-implanted p-i-n modulator. Curves 22 and 24 show the reflectivity for an implanted ($1\times10^{13}$ cm$^{-2}$) p-i-n modulator realized in accordance with the inventive principles above. FIG. 2 shows that the reflectivity and, therefore, the modulation performance is substantially the same for implanted and non-implanted devices placed in a Fabry-Perot etalon.

FIG. 3 shows a comparison of reflectivity versus wavelength for two p-i-n modulators operated at two different bias levels. The p-i-n modulators were anti-reflection coated on the top surface and incorporated GaAs quantum well layers and AlAs barrier layers in the intrinsic quantum well region. The p-i-n modulators were subjected to bias potentials of 0 V and $-1.25$ V over a range of incident optical wavelengths between 800 nm and 900 nm. Curves 31 and 33 show the reflectivity for a non-implanted p-i-n modulator. Curves 32 and 34 show the reflectivity for an implanted ($1\times10^{13}$ cm$^{-2}$) p-i-n modulator realized in accordance with the inventive principles above. FIG. 3 shows that reflectivity differs under applied bias conditions for implanted and non-implanted devices, both anti-reflection coated.

FIG. 4 shows the reflectivity for two implanted p-i-n devices and one non-implanted device as a function of bias voltage. All devices were subject to a low power incident optical power beam at a wavelength of approximately 856 nm. Curve 41 corresponds to the reflectivity for the non-implanted p-i-n device while curves 42 and 43 show the reflectivity for p-i-n device having implantation dose levels of $1\times10^{12}$ cm$^{-2}$ and $1\times10^{-}$cm$^{-2}$, respectively. A comparison of these curves clearly shows that the contrast ratio and, therefore, the modulation performance for the implanted p-i-n modulators are substantially equivalent to that for the non-implanted device.

Figure 5:
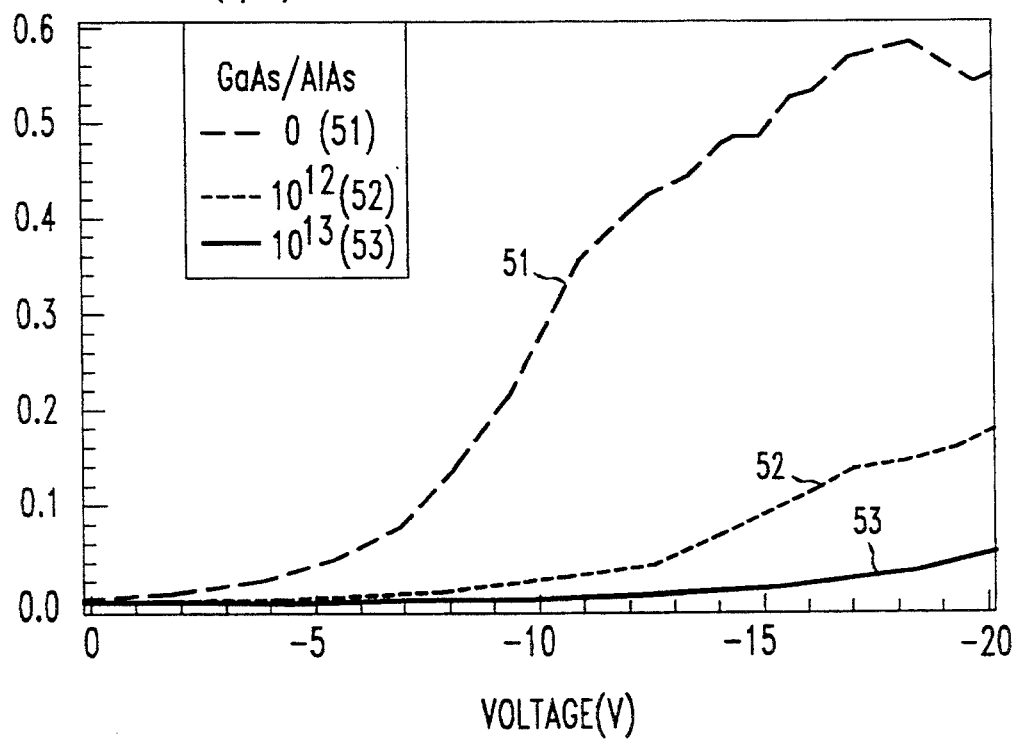
FIG. 5 shows responsivity versus applied voltage for devices in Fabry-Perot etalons wherein the devices are both implanted and non-implanted.

FIG. 5 shows the responsivity, measured in amps per watt, for two implanted p-i-n devices and one non-implanted p-i-n device as a function of applied bias voltage. Responsivity is defined to be the ratio of photocurrent generated to an incident optical power level. The devices and incident optical power conditions were substantially identical to those utilized in reference to FIG. 4. Curve 51 corresponds to the reflectivity for the non-implanted p-i-n device while curves 52 and 53 show the reflectivity for p-i-n device having implantation dose levels of $1\times10^{-12}$ cm$^{-2}$ and $1\times10^{13}$ cm$^{-2}$, respectively. A comparison of these curves clearly shows that the photocurrent is significantly suppressed by the implanted p-i-n devices realized in accordance with the principles of the present invention. At a bias of 12.5 V, the responsivity of the non-implanted modulator is 0.42 A/W, while the responsivity of the implanted ($1\times10^{13}$) modulator is 0.0075 A/W—a photocurrent suppression improvement by a factor of 56. All the devices whose results are shown in FIGS. 4 and 5 included Fabry-Perot etalons. It should be noted that the anti-reflection coating of the p-i-n modulator provides a similar degree of photocurrent suppression as reported above for the modulator in the Fabry-Perot etalon.

Photocurrent suppression for the implanted, quantum well, p-i-n modulator is achieved when the non-radiative recombination rate for the charge carriers dominates the carrier sweep-out, or collection, rate and the radiative recombination rate. The degree of photocurrent suppression and, intuitively, the dominance of the non-radiative recombination rate are better understood from a relationship stating that, if the non-radiative recombination rate is N times the carrier collection rate and is also much greater than the radiative recombination rate, then the photocurrent will be suppressed by the ratio of $1/(1+N)$. If N equals 9, then the photocurrent will be approximately one-tenth that of the modulator without non-radiative recombination centers. It will now be appreciated that the non-radiative recombination rate is proportional to the number of non-radiative recombination centers per unit volume of material. Similarly, the degree of exciton broadening in the quantum wells is also proportional to the number of non-radiative recombination centers per unit volume of material.

It is understood that, while the material systems GaAs/AlAs and GaAs/AlGaAs are described above for fabricating the semiconductor modulator structure, other material may be selected for other semiconductor Group III-V systems such as InGaAs/InAlAs, InGaAs/InGaAlAs, GaAsSb/GaAlAsSb, and InGaAsP/InP. In these semiconductor systems, the layers may be lattice matched to suitable GaAs or InP substrates. Mismatching is also contemplated wherein strained layers are grown over substrate material. Finally, extension of the device structures is also contemplated to semiconductor compounds in Group TI-VI and Group IV.

The device structure described above is operated in the reflection mode. It is contemplated that the use of transparent substrate material or even the etching of a shallow recess into the substrate to permit more effective light transmission through the modulator is desirable for operating the device as a transmissive mode modulator. That is, the light is incident on the top surface of the modulator and exits through the bottom surface thereof or vice versa. Such techniques are well known among persons of ordinary skill in the art.

What is claimed is:

1. An optical modulator including first and second semiconductor regions having substantially opposite conductivity type, means for applying an electrical potential to the first and second regions, and a third semiconductor region comprising intrinsic material positioned between the first and second regions and including first and second wide bandgap barrier layers separated by a narrow bandgap quantum well layer, wherein at least said narrow bandgap quantum well layer includes a sufficient number of non-radiative recombination centers to cause carrier lifetime to be shorter in said third semiconductor region than in either of the first or second semiconductor regions.

2. The optical modulator as defined in claim 1 further including first and second reflective elements disposed on the modulator to form a Fabry-Perot etalon incorporating the first, second and third regions within said etalon.

3. The optical modulator as defined in claim 1 wherein the non-radiative recombination centers are formed by ion implantation.

4. The optical modulator as defined in claim 1 wherein the first region comprises p-type AlGaAs, the second region comprises n-type AlGaAs, and the third region comprises a GaAs quantum well layer and AlAs barrier layers.

5. An optical modulator including first and second semiconductor regions having substantially opposite conductivity type, means for applying an electrical potential to the first and second regions, and third semiconductor region comprising intrinsic material positioned between the first and second regions and including first and second wide bandgap barrier layers separated by a narrow bandgap quantum well layer, wherein the third region includes means for increasing a non-radiative recombination rate therein to dominate a radiative recombination rate and a carrier collection rate therein.

6. The optical modulator as defined in claim 5 further including first and second reflective elements disposed on the modulator to form a Fabry-Perot etalon incorporating the first, second and third regions within said etalon.

7. The optical modulator as defined in claim 5 wherein said means includes non-radiative recombination centers formed by ion implantation.

8. The optical modulator as defined in claim 5 wherein the first region comprises p-type AlGaAs, the second region comprises n-type AlGaAs, and the third region comprises a GaAs quantum well layer and AlAs barrier layers.

* * * * *